United States Patent
Boroczky et al.

(10) Patent No.: US 7,161,633 B2
(45) Date of Patent: Jan. 9, 2007

(54) APPARATUS AND METHOD FOR PROVIDING A USEFULNESS METRIC BASED ON CODING INFORMATION FOR VIDEO ENHANCEMENT

(75) Inventors: Lilla Boroczky, Mount Kisco, NY (US); Johan Janssen, South Salem, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 579 days.

(21) Appl. No.: 09/976,329

(22) Filed: Oct. 12, 2001

(65) Prior Publication Data

US 2002/0131512 A1    Sep. 19, 2002

Related U.S. Application Data

(60) Provisional application No. 60/260,843, filed on Jan. 10, 2001.

(51) Int. Cl.
*H04N 5/21* (2006.01)

(52) U.S. Cl. ........... 348/606; 348/625; 375/240.29; 382/275

(58) Field of Classification Search ........ 348/606–608, 348/625, 613; 375/240.29; 382/274, 275, 382/263, 254
See application file for complete search history.

(56) References Cited

U.S. PATENT DOCUMENTS

| | | | | |
|---|---|---|---|---|
| 5,031,042 A | * | 7/1991 | Rabii ...................... | 348/606 |
| 5,491,514 A | * | 2/1996 | Fukuda et al. ............ | 375/240.1 |
| 5,977,964 A | * | 11/1999 | Williams et al. ........... | 345/721 |
| 6,037,986 A | * | 3/2000 | Zhang et al. .......... | 375/240.12 |
| 6,115,503 A | * | 9/2000 | Kaup ....................... | 382/268 |
| 6,137,904 A | * | 10/2000 | Lubin et al. ................ | 382/162 |
| 6,192,083 B1 | * | 2/2001 | Linzer et al. .......... | 375/240.29 |
| 6,466,624 B1 | * | 10/2002 | Fogg ..................... | 375/240.27 |
| 6,466,625 B1 | * | 10/2002 | Kobayashi et al. .... | 375/240.29 |
| 6,600,839 B1 | * | 7/2003 | Mancuso et al. ........... | 382/268 |
| 6,611,295 B1 | * | 8/2003 | Drouot et al. ............. | 348/607 |
| 6,636,645 B1 | * | 10/2003 | Yu et al. .................... | 382/268 |
| 6,810,082 B1 | * | 10/2004 | Shen et al. .............. | 375/240.2 |
| 6,847,738 B1 | * | 1/2005 | Scognamiglio et al. .... | 382/260 |
| 6,950,561 B1 | * | 9/2005 | Boroczky et al. .......... | 382/263 |

FOREIGN PATENT DOCUMENTS

| | | |
|---|---|---|
| WO | 0042778 A1 | 7/2000 |
| WO | 0145389 A1 | 6/2001 |

OTHER PUBLICATIONS

"A Compressed Video Enhancement Algorithm", by Chun-Jen Tsai et al., Proceedings of IEEE ICIP 1999, Kobe Japan, Oct. 25-28, 1999.

(Continued)

*Primary Examiner*—Victor R. Kostak
(74) *Attorney, Agent, or Firm*—Larry Liberchuk (57) ABSTRACT

An apparatus and method for enhancing the quality of a digital video signal uses coding information for use in connection with spatial domain sharpness enhancement algorithms used in multimedia devices. The sharpness of previously encoded or transcoded digital video images is enhanced without enhancing encoding artifacts. The apparatus includes a usefulness metric generator that identifies a limit to the sharpness enhancement of an image that can be applied to a previously coded digital video that represents a sequence of images without enhancing coding artifacts. The usefulness metric generator applies the usefulness metric to at least one sharpness enhancement algorithm. The usefulness metric and the sharpness enhancement algorithm are separate so that the usefulness metric can be used with a variety of video enhancement algorithms.

19 Claims, 4 Drawing Sheets

OTHER PUBLICATIONS

"Improved Decoding of MPEG-2 Coded Video", by B. Martins et al., Proceedings of IBC '2000, Amsterdam, The Netherlands, Sep. 7-12, 2000, pp. 109-115.

"Pre-and Post-Processing Algorithms for Compressed Video Enhancement", by C. Andrew Segall et al., pp. 1369-1373. XP-001004077.

* cited by examiner

APPARATUS AND METHOD FOR PROVIDING A USEFULNESS METRIC BASED ON CODING INFORMATION FOR VIDEO ENHANCEMENT

REFERENCE TO PROVISIONAL APPLICATION

This patent application refers to and claims the priority and benefit of Provisional Patent Application Ser. No. 60/260,843 filed Jan. 10, 2001.

RELATED APPLICATION

This patent application is related to co-pending U.S. patent application Ser. No. filed 09/976,340, 2001 by Boroczky et al. entitled "Method and Apparatus for Sharpness Enhancement for Coded Video." The related patent application is commonly assigned to the assignee of the present invention. The disclosures of the related patent application is hereby incorporated by reference in the present application as if fully set forth herein.

TECHNICAL FIELD OF THE INVENTION

The present invention is directed to an apparatus and method for enhancing the quality of a digital video signal using coding information. The apparatus and method of the invention enhances the sharpness of encoded or transcoded digital video without enhancing encoding artifacts. The invention may be used in connection with spatial domain sharpness enhancement algorithms used in multimedia devices.

BACKGROUND OF THE INVENTION

The development of high quality multimedia devices, such as set-top boxes, high-end televisions, digital televisions, personal televisions, storage products, personal digital assistants (PDAs), wireless internet devices, etc., is leading to a variety of architectures and to more openness towards new features for these devices. The development of these new products and their ability to display video data in any format has resulted in new requirements and opportunities with respect to video processing and video enhancement algorithms. Most of these devices receive and/or store video in the MPEG-2 format. In the future many of these devices may also receive and/or store video in the MPEG-4 format. The picture quality of these MPEG sources can vary between very good and extremely bad.

Next generation storage devices, such as the blue laser based Digital Video Recorder, will have high definition (HD) capability to some extent. A Digital Video Recorder (DVR) is a good example of a type of device for which a new method of video image enhancement would be advantageous. An HD program is typically broadcast at twenty million bits per second (20 Mb/s) and encoded according to the MPEG-2 video standard. The storage capacity of a Digital Video Recorder is in the range of approximately twenty to twenty five Gigabytes (20 GB to 25 GB). This represents about two (2) hours of recording time of HD video per video disc.

To increase the amount of record time per video disc, long play modes can be defined. For example, in a Long Play (LP) mode, a broadcast bitrate of twenty million bits per second (20 Mb/s) may be recorded at a storage bitrate of ten million bits per second (10 Mb/s). This will provide about four (4) hours of recording time per video disc. In an Extended Long Play (ELP) mode, a broadcast bitrate of twenty million bits per second (20 Mb/s) may be recorded at a storage bitrate of five million bits per second (5 Mb/s). This will provide about eight (8) hours of recording time per video disc.

The process of transforming a high bitrate bitstream to a lower bitrate bitstream is referred to as "bit rate transcoding." One method of transcoding a high bitrate bitstream into a lower bitrate bitstream involves the steps of decoding the high rate bitstream with an MPEG-2 decoder and then encoding the resulting bitstream at the lower bitrate. Another method of transcoding a high bitrate bitstream involves directly transcoding the bitstream to a lower bitrate without fully decoding and re-encoding the video. This method is known as Direct Bitrate Transcoding (DBT).

The process of MPEG-2 transcoding may decrease the picture quality (e.g., sharpness) of the video sequence due to the loss of information. However, it is desirable that the picture quality not be compromised too much. This is especially important for the Long Play (LP) mode. Therefore, the post-processing of transcoded video signals plays an important role in improving the perceived picture quality.

Most of the state of the art sharpness enhancement algorithms have been developed and optimized for analog video transmission standards like NTSC, PAL and SECAM. Traditionally, image enhancement algorithms either reduce certain unwanted aspects in a picture (e.g., noise reduction) or improve certain desired characteristics of an image (e.g., sharpness enhancement). For the newly emerging digital storage devices, digital televisions, set top boxes, and other similar devices, the traditional sharpness enhancement algorithms may perform sub-optimally on MPEG encoded or transcoded video due to the different characteristics of these sources. In a closed video processing chain of a storage system, information that allows the quality of the encoded source to be determined can be derived from the MPEG stream. This information can potentially be used to increase the performance of video enhancement algorithms.

Because image quality will remain a distinguishing factor for high-end video products, new approaches for performing image enhancement, specifically adapted for use with these digital sources, will be beneficial. In a paper entitled "A Compressed Video Enhancement Algorithm" by C. J. Tsai, P. Karunaratne, N. P. Galatsanos and A. K. Katsaggelos, Proc. of IEEE, ICIP '99, Kobe, Japan, Oct. 25–28, 1999, the authors propose an iterative algorithm for enhancing video sequences that are encoded at low bitrates. For MPEG sources the degradation of the picture quality originates mostly from the quantization function. Thus, the iterative gradient-projection algorithm employed by the authors uses coding information such as quantization step size, macroblock types and forward motion vectors in its cost function. The algorithm shows promising results for low bitrate video. However, its main disadvantage is its high computational complexity.

In a paper entitled "Improved Decoding of MPEG-2 Coded Video" by B. Martins and S. Forchammer, Proc. of IBC2000, pp. 109–115, Amsterdam, The Netherlands, Sep. 7–12, 2000, the authors describe a new concept for improving the decoding of MPEG-2 coded video. Specifically, a unified approach for deinterlacing and format conversion, integrated in the decoding process, is proposed. The technique results in considerably higher picture quality than that obtained by ordinary decoding. However, to date, its computational complexity prevents its implementation in consumer applications.

Both papers describe video enhancement algorithms using MPEG coding information. However, both of these scenarios, in addition to being impractical, combine the enhancement and the cost function. A cost function determines how much, and at which locations in a picture, enhancement can be applied. The problem that results from this combination of cost and enhancement functions is that only one algorithm can be used with the cost function.

It would therefore be desirable to have an apparatus and method for video enhancement capable of effectively enhancing encoded and transcoded video sources.

SUMMARY OF THE INVENTION

The present invention generally comprises an apparatus and method for enhancing the quality of a digital video signal using coding information. The invention comprises a usefulness metric that calculates how much each individual pixel can be enhanced without increasing coding artifacts.

The apparatus comprises a usefulness metric generator that is capable of determining a limit to the amount of sharpness enhancement of an image that can be applied to a previously coded digital video that represents a sequence of images without enhancing coding artifacts. The usefulness metric generator applies the usefulness metric to at least one sharpness enhancement algorithm. The usefulness metric and the sharpness enhancement algorithm are separate so that the usefulness metric can be used with a variety of video enhancement algorithms.

It is a primary object of the present invention to provide an apparatus and method that uses a usefulness metric to regulate the application of a video enhancement algorithm to digital video.

It is another object of the present invention to provide a usefulness metric that is separate from a video enhancement algorithm so that a variety of different video enhancement algorithms can be used in conjunction with the usefulness metric.

It is a further object of the present invention to provide an apparatus and method in which a usefulness metric can be tuned towards the constraints of the apparatus in order to assure an optimal trade off between performance and complexity of the apparatus.

It is a further object of the invention to provide an apparatus and method of digital video enhancement that will perform optimally with encoded and transcoded video sources.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document. Those of ordinary skill in the art should understand that in many, if not most, instances such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments set forth in this patent document to describe the principles of the apparatus and method of the present invention are by way of illustration only and should not be construed in any way to limit the scope of the invention. The apparatus and method of the present invention will be described as an apparatus and method for enhancing a video signal in a digital television set. It is important to realize that the apparatus and method of the present invention is not limited to digital television sets. Those skilled in the art will readily understand that the principles of the present invention may also be successfully applied in any type of digital video system, including, without limitation, television receivers, set top boxes, storage devices, computer video display systems, and any type of electronic equipment that utilizes or processes digital video signals. The term "digital video system" is used to refer to these types of equipment.

In the descriptions that follow, a digital television set is employed as an illustration of a digital video system.

Figure 1:
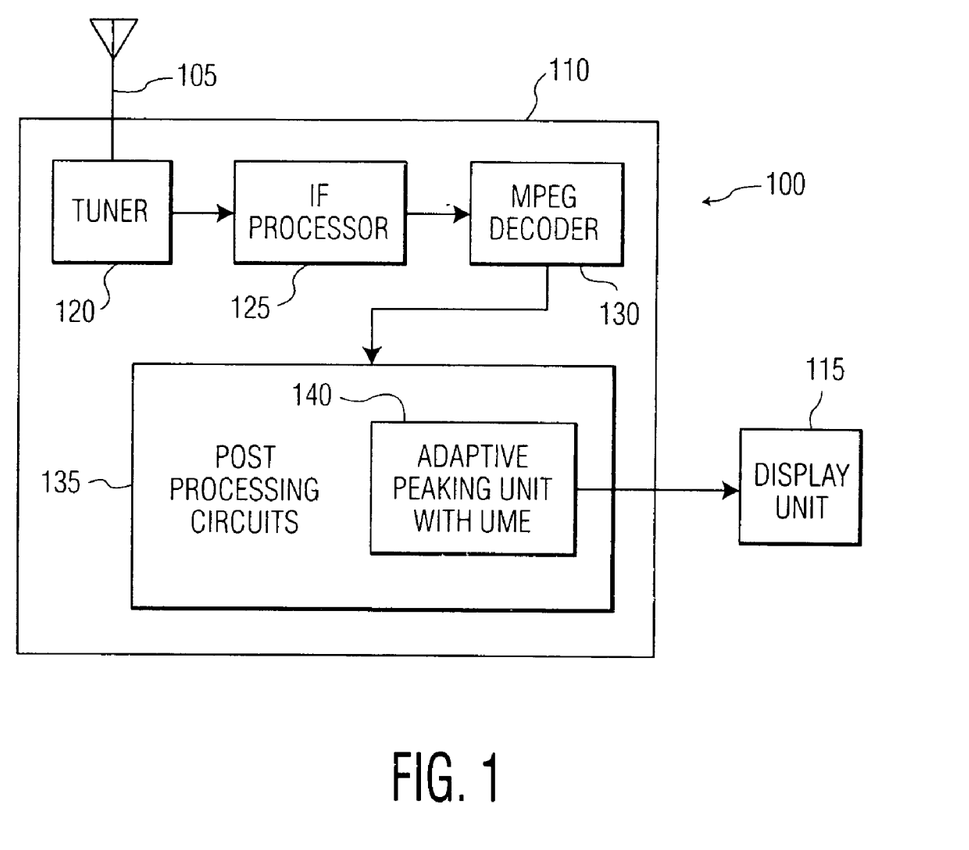
FIG. 1 is a block diagram of an exemplary digital television set comprising the apparatus and method of the present invention.

FIG. 1 is a block diagram of a digital television set 100 that utilizes the apparatus and method of the present invention. Digital television set 100 comprises television receiver 110 and display unit 115. Display unit 115 may be a cathode ray tube or a flat panel display or any type of equipment for displaying video images. Television receiver 110 comprises antenna 105 for receiving television signals. Antenna 105 is coupled to tuner 120. Tuner 120 is coupled to intermediate frequency ("IF") processor 125. IF processor 125 is coupled to MPEG decoder 130.

As will be more fully explained, the present invention calculates a Usefulness Metric for Enhancement (UME) for enhancing video signal quality. The output of MPEG decoder 130 is coupled to post-processing circuits 135. Post processing circuits 135 comprise adaptive peaking unit 140 comprising the usefulness metric (UME) of the present invention. Adaptive peaking unit 140 may be located at an appropriate location within the post-processing circuits 135. The output of post-processing circuits 135 is input to display unit 115.

Adaptive peaking unit 140 processes the video signals that it receives from MPEG decoder 130. Adaptive peaking unit 140 uses the usefulness metric (UME) to generate a value of a coding gain for use in the adaptive peaking process. The process of adaptive peaking is illustrative and shows how the usefulness metric (UME) of the present invention may be used. It is understood that the apparatus and method of the present invention is not limited to the process of adaptive peaking. The usefulness metric (UME) may be used with more than one type of video enhancement algorithm.

Adaptive peaking unit 140 processes the video signals in a manner that takes into account the coded information in the video signal. The output of adaptive peaking unit 140 is an enhanced luminance signal for the video signals that adaptive peaking unit 140 receives from MPEG decoder 130. The luminance signal that is determined by adaptive peaking unit 140 provides a more accurate and visually distinct video image than that provided by prior art adaptive peaking units. Adaptive peaking unit 140 transfers the enhanced luminance signal to other circuits within post processing circuits 135. Post-processing circuits 135 are capable of utilizing the enhanced luminance signal to enhance the quality of video signals.

Post-processing circuits 135 are capable of carrying out several different types of video signal processing. For example, some of the video signal processing applications include (a) noise level adaptive noise reduction algorithms, (b) noise level adaptive sharpness enhancement, (c) noise level adaptive luminance-chrominance separation, (d) noise level adaptive motion detection, (e) noise level adaptive motion estimation and compensation, (f) noise level adaptive up-conversion, (g) noise level adaptive feature enhancement, and (h) noise level adaptive object based algorithms.

Figure 2:
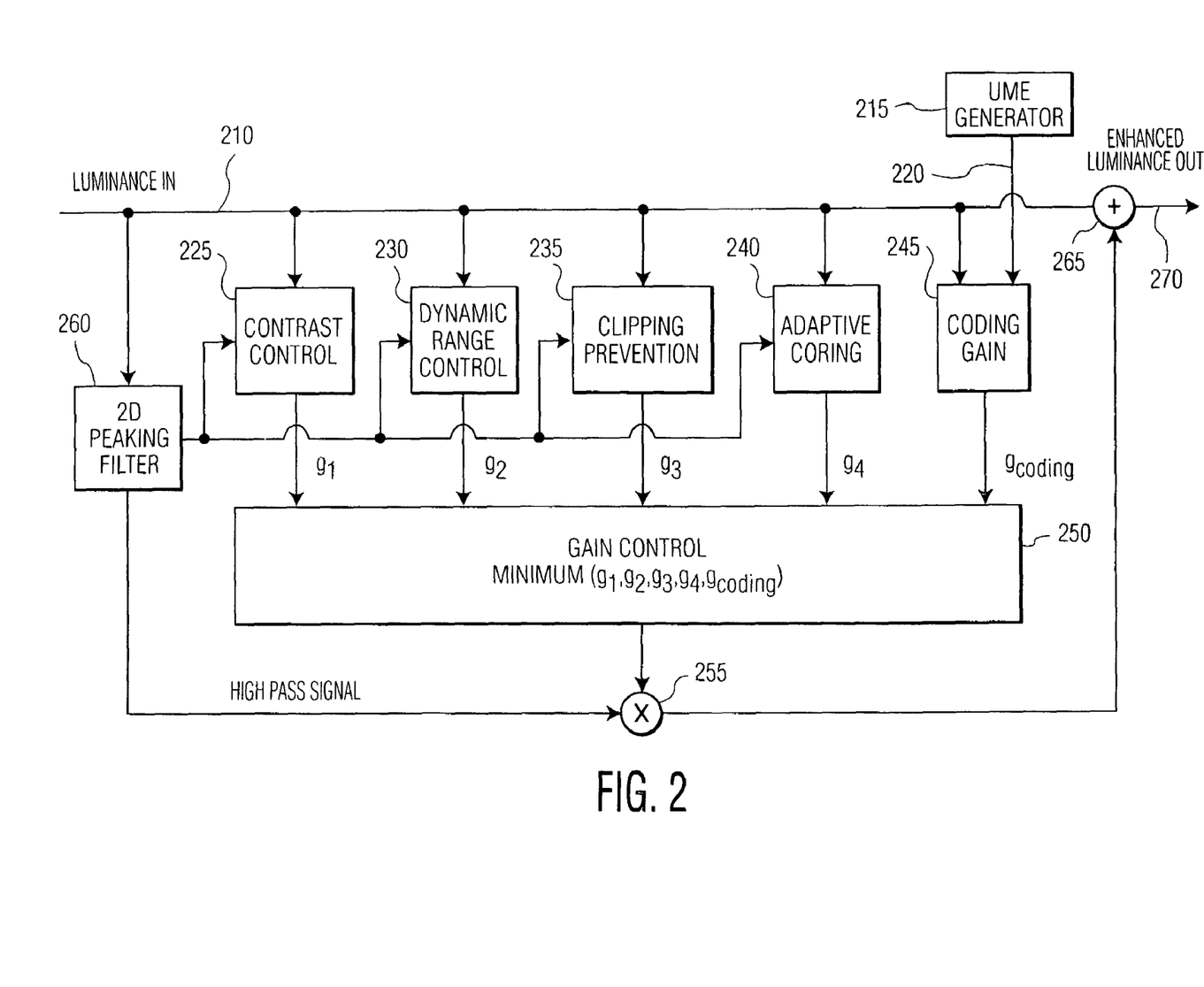
FIG. 2 is a block diagram illustrating an advantageous embodiment of an adaptive peaking unit comprising a usefulness metric generator and a coding gain control block of the present invention.

FIG. 2 is a block diagram illustrating the apparatus and method of adaptive peaking unit 140 according to one advantageous embodiment of the present invention. FIG. 2 illustrates how the usefulness metric (UME) of the present invention can be applied to an adaptive peaking algorithm for sharpness enhancement. The adaptive peaking algorithm is directed at increasing the amplitude of the transient of an input luminance signal 210. The adaptive peaking algorithm does not always provide optimal video quality for an "a priori" encoded/transcoded video source. This is mainly a result of the fact that the characteristics of the MPEG source are not taken into account.

In the present invention, a usefulness metric generator 215 generates a usefulness metric (UME). The usefulness metric (UME) is designated with reference numeral 220. UME 220 takes into account the characteristics of the MPEG source. The original algorithm is extended by using UME 220, thereby significantly increasing the performance of the algorithm.

The principles used by adaptive peaking algorithms are well known in the prior art. One example of an adaptive peaking algorithm utilizes four (4) control blocks. As shown in FIG. 2, the four (4) control blocks are contrast control block 225, dynamic range control block 230, clipping prevention block 235, and adaptive coring block 240. Contrast control block 225 generates gain signal "g1". Dynamic range control block 230 generates gain signal "g2". Clipping prevention block 235 generates gain signal "g3". Adaptive coring block 240 generates gain signal "g1".

These four (4) pixel based control blocks take into account particular local characteristics of the video signal such as contrast, dynamic range, and noise level. However, these four (4) control blocks do not taking into account information concerning coding properties.

The apparatus of the present invention provides a coding gain block 245. Coding gain block 245 uses usefulness metric (UME) 220 to determine the allowable amount of peaking. Coding gain block 245 generates gain signal "$g_{coding}$". Dynamic gain control block 250 selects the minimum of the five (5) gain signals (g1, g2, g3, g4, $g_{coding}$) to generate a final gain signal "g". Multiplier circuit 255 multiplies the final gain signal "g" by the high pass signal that has been filtered by 2D peaking filter 260. Adder 265 adds the product from multiplier circuit 255 to the original luminance value of a pixel represented by luminance input signal 210. In this manner, the enhanced luminance output signal 270 is generated.

UME 220 calculates (on a pixel by pixel basis or on a regional basis) how much a pixel or region can be enhanced without increasing coding artifacts. UME 220 is derived from the MPEG coding information present in the bitstream. The coding information present in the bitstream can be retrieved during the decoding procedure. Choosing the MPEG information to be used with UME 220 is far from trivial. UME 220 must provide an indication of the spatio-temporal characteristics or picture quality of the video.

The finest granularity of MPEG information that can be directly obtained during decoding is either (1) based on macroblock (MB) quantities, or (2) based on block based quantities. However, for spatial (pixel) domain video enhancement, the UME must be calculated for each pixel of a picture in order to ensure the highest picture quality.

One parameter easily extracted from MPEG information is the quantization parameter, as it is present in every coded macroblock (MB). The higher the quantization parameter, the coarser the quantization, and therefore, the higher the quantization error. A high quantization error results in coding artifacts and consequently, enhancement of pixels in a macroblock (MB) with a high quantization parameter must be suppressed more.

Another useful item of information is the number of bits spent to code a macroblock (MB) or a block. The number of bits spent can be compared to the average number of bits spent in a macroblock (MB) or block in a particular picture. However, this quantity is also highly dependent on scene content, bitrate, picture type (such as I (intra), P (predicted), B (bidirectionally predicted) picture types), motion estimation, and motion compensation.

It is also possible to consider the distribution of existing DCT coefficients in a block. It is also possible to use the motion vectors to obtain information on the temporal characteristics of the video to be enhanced. It is well known that the motion vectors estimated and used for MPEG encoding do not necessarily represent true motion in the video. However, the motion vectors can help to identify static areas and use the static areas to improve the temporal consistency of the enhancement from frame to frame even when the motion vectors are not reliable.

Both the quantization parameter and the number of bits spent (to code a macroblock (MB) or a block) are widely used in rate control calculations of MPEG encoding. The quantization parameter and the number of bits spent and are commonly used to calculate the coding complexity.

Example One for UME. The "coding complexity" is defined as the product of the quantization parameter and the number of bits spent to encode a macroblock (MB) or a block. Coding complexity is therefore described by the following equation:

$$\text{compl}_{MB/block}(k,h) = m\text{quant}(k,h) * \text{bits}_{MB/block}(k,h) \quad (1)$$

where "mquant" is the quantization parameter and "$\text{bits}_{MB/block}$" is the number of bits of DCT coefficients used to encode the macroblock (k,h) or the block (k,h). The underlying assumption is that the higher the complexity of a macroblock (MB) or a block with respect to the average complexity of a frame, the higher the probability of having coding artifacts in that macroblock (MB) or in that block. Thus, the enhancement should be suppressed for the pixels of the blocks with relatively high coding complexity.

Accordingly, the UME of pixel (i,j) is defined by the following equation:

$$UME(i,j) = 1 - \text{compl}_{pixel}(i,j)/2 * \text{compl}_{AVE} \quad (2)$$

where $\text{compl}_{pixel}(i,j)$ is the coding complexity of pixel (i,j) and $\text{compl}_{AVE}$ is the average coding complexity of a picture. The value of $\text{compl}_{AVE}$ can be estimated as:

$$\text{compl}_{AVE} = (1/NB) * \sum_{NB} \text{coding\_compl}_{block} \quad (3)$$

where NB is the number of blocks present in a picture and $\text{coding\_compl}_{block}$ is the coding complexity of a block.

In the present invention, $\text{compl}_{pixel}(i,j)$ is estimated from the macroblock (MB) or block complexity map by means of bilinear interpolation. Other interpolation methods such as higher order interpolation are also possible.

The complexity map of the macroblock (MB)/block has an inherited block structure. To decrease this characteristic of the complexity map (which is undesirable for UME), a spatial low pass filtering is applied to the map. The filter kernel used for low pass filtering is:

$$LP_{compl\_map} = \begin{bmatrix} 1 & 1 & 1 \\ 1 & 1 & 1 \\ 1 & 1 & 1 \end{bmatrix} \quad (4)$$

Other types of low pass filtering are also possible.

In one advantageous embodiment of the invention, the value of UME(i,j) can range from a value of "zero" ("0") to a value of "one" ("1"). A value of "zero" for UME(i,j) means that no sharpness enhancement is allowed for a particular pixel, while a value of "one" means that the pixel can be freely enhanced without the risk of enhancing any coding artifacts.

To incorporate a stronger bitrate dependency, Equation (2) can be extended by the addition of a term directly related to the quantization parameter. This can be especially advantageous for video that has been encoded at a low bitrate.

Figure 3:
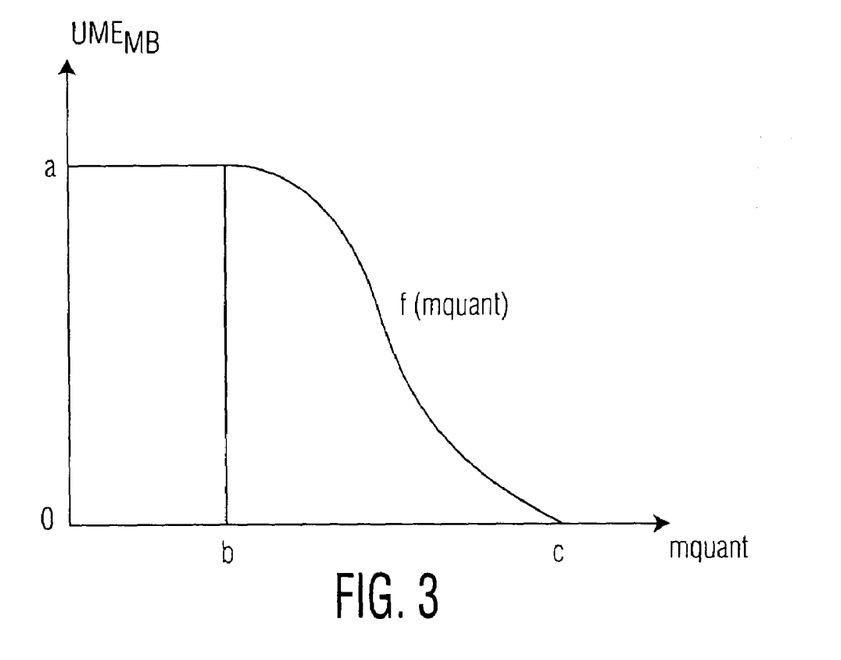
FIG. 3 is a diagram illustrating a graph of a function that represents a usefulness metric of the invention versus a quantization parameter.

Example Two for UME. In this example it is assumed that only the quantization parameter will be used in the UME calculation. Because a larger quantization parameter value usually results in increased coding artifacts, the UME should be inversely related to the quantization parameter, mquant. A possible function of the UME for MB(k,h) is given in the following equation:

$$UME_{MB}(k,h) = \begin{cases} a & \text{if} \quad mquant(k,h) < b \\ f(mquant(k,h)) & \text{if} \quad b \leq mquant(k,h) < c \\ 0 & \text{if} \quad mquant(k,h) \geq c \end{cases} \quad (5)$$

where the variables a, b, c and the function f can be determined experimentally. The function for $UME_{MB}(k,h)$ set forth in Equation (5) is graphically illustrated in FIG. 3. The $UME_{MB}(k,h)$ in Equation (5) is calculated for each macroblock (MB) because one quantization parameter is assigned to one macroblock (MB) in the encoding procedure. Therefore, the $UME_{MB}(k,h)$ for each pixel of a frame can be obtained by interpolating the macroblock (MB) level UME map.

The MPEG-2 video compression standard allows the encoding of certain macroblocks (MB) and blocks in P (predicted) and B (bidirectionally predicted) pictures with no data. These macroblocks are called "skipped" macroblocks. Skipped macroblocks (MB) can be reconstructed in the decoding procedure using the reference pictures and coding information from the most recently coded and non-skipped macroblocks (MB). Furthermore, for macroblocks (MB) that are fully motion compensated, there are no DCT data in the bitstream or certain blocks in a macroblock (MB) are not coded.

For macroblocks (MB) and blocks that are skipped or not encoded the encoded bitstream does not contain the necessary coding information to calculate the UME. To remedy this deficiency, the UME can be estimated, for example, using one of the following two methods.

A first method is to use neighboring non-skipped or coded macroblocks (MB) to estimate the UME for the skipped or non-coded macroblocks (MB) or blocks. In one advantageous embodiment, a three (3) by three (3) estimation window is used. The estimation window is centered on the skipped or non-coded macroblock (MB). If all of the macroblocks (MB) are skipped or non-coded in the estimation window, then the complexity of the skipped or non-coded macroblock (MB) is taken to be half of the average complexity of the frame. This method works well if a picture has relatively low numbers of skipped macroblocks (MB). If the picture has a low bitrate encoding or has static scenes, this method of estimation is too coarse.

A second method is to assign the same UME to the skipped or non-coded macroblock (MB) as was assigned to the corresponding macroblock (MB) of the previous frame using motion compensation.

Because the UME is calculated to account for coding characteristics, the UME only prevents the enhancement of coding artifacts such as blocking and ringing. Thus, the prevention or reduction of artifacts of non-coding origin, which might result from applying too much enhancement, is addressed by other parts of the sharpness enhancement algorithm.

The UME can be combined with any peaking algorithm. Alternatively, the UME can be adapted to any spatial domain sharpness enhancement algorithm. It is also possible to utilize only coding information in combination with an adaptive peaking algorithm. It is also possible to utilize coding information incorporating scene content related information in combination with an adaptive peaking algorithm.

Figure 4:
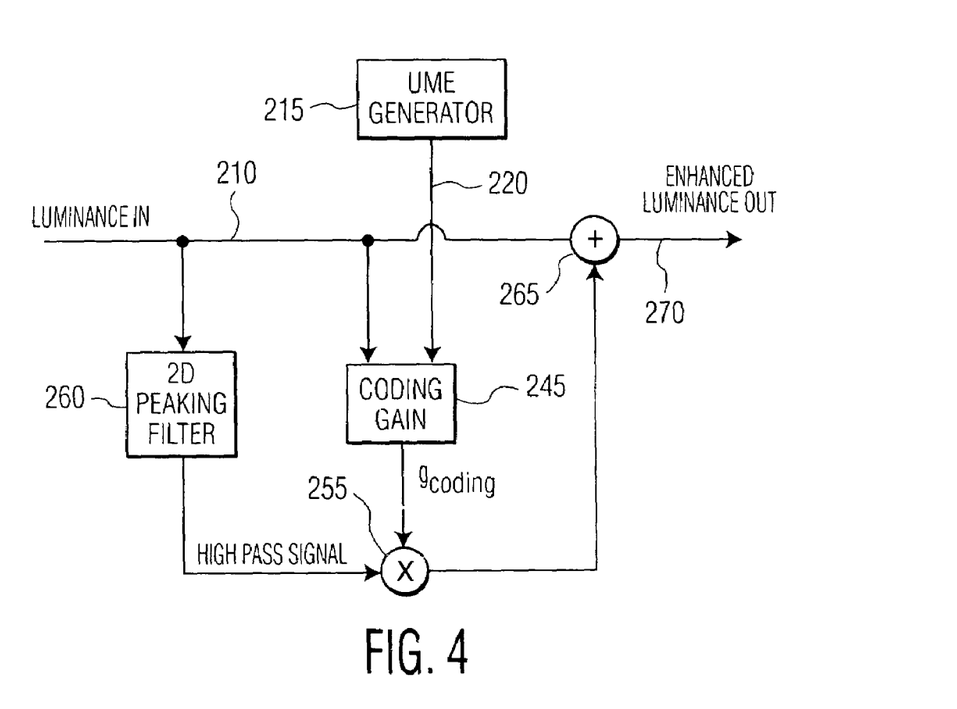
FIG. 4 is a block diagram illustrating an alternate advantageous embodiment of an adaptive peaking unit comprising a usefulness metric generator and a coding gain control block of the present invention.

FIG. 4 illustrates such an embodiment. In FIG. 4, the four (4) control blocks 225, 230, 235, and 240 of FIG. 1 have been eliminated. Only coding gain block 245 remains. Scene content information, such as edge information, is incorporated into the coding gain calculation. The scene content related information compensates for the uncertainty of the calculation of UME 220 that arises from assumptions made and interpolations applied in the calculation of UME 220.

In the embodiment shown in FIG. 4 the coding gain of a pixel (i,j) is determined as the sum of two (2) terms according to the following equation:

$$g_{coding}(i,j) = UME(i,j) + g_{edge}(i,j) \quad (6)$$

The term UME(i,j) is defined above and can be calculated from Equation (2) or Equation (5). The term $g_{edge}(i,j)$ is based on edge related pixel information and is calculated adaptively based on the output of edge detection. One exemplary method for calculating $g_{edge}(i,j)$ involves the assumptions: (1) that p(i,j) is an edge pixel at the spatial location (i,j), and (2) that p(i,j) is located at the edge center or that p(i,j) is the closest pixel to the edge center. Then the term $g_{edge}(i,j)$ may be calculated as:

$$g_{edge}(i,j) = \begin{cases} c & \text{for } p\ (i,j) \text{ edge pixel} \\ \frac{c}{2} & \text{for } p\ (i-1,j) \text{ and } p\ (i+1,j) \\ \frac{c}{4} & \text{for } p\ (i-2,j) \text{ and } p\ (i+2,j) \\ 0 & \text{otherwise} \end{cases} \quad (7)$$

where the value c is determined experimentally.

Note that if the edge related term is used in the coding gain calculation, then the edge detection should exclude block boundaries of blocking artifacts as well as false edges of ringing which may occur in image sequences coded at low bit rates.

Abrupt frame-to-frame changes in the coding gain for any given pixel can result in temporally inconsistent sharpness enhancement, which is undesirable. Such changes can also intensify temporally visible and annoying artifacts such as mosquito noise.

To remedy this effect, temporal filtering is applied to the coding gain using the gain of the previous frame. The temporal filtering can be a simple temporal infinite impulse response (IIR) filter or a motion compensated filter. One possible IIR filter that does not use motion compensation is given by the equation:

$$\text{gain}_{coding}(i,j) = k \cdot \text{gain}_{coding}(i,j,t) + (1-k) \cdot \text{gain}_{coding}(i,j, t-1) \quad (8)$$

where t represents the current frame and k is the IIR filter coefficient.

The UME may be calculated based on the coding complexity of Equation (2). To reduce the high computational complexity and memory requirement, instead of filtering the gain map, the macroblock (MB) or block-based complexity map is filtered temporally using an infinite impulse response (IIR) filter. This process is represented in the following equation:

$$\text{compl}_{MB/block}(r,s,t) = k \cdot \text{compl}_{MB/block}(r,s,t) + scal \cdot (1-k) \cdot \text{compl}_{MB/block}(r,s,t-1) \quad (9)$$

where (r, s) is the spatial coordinate of a macroblock (MB) or a block, and t represents the current picture, and k is the infinite impulse response (IIR) filter coefficient and "scal" is a scaling term taking into account the complexity among different picture types. The scaling term "scal" is calculated as the ratio of the average MB or block complexity of frame "t" and "t−1".

Specifically:

$$scal = \frac{[compl_{MB/block}(r,s,t)]_{AVERAGE}}{[compl_{MB/block}(r,s,t-1)]_{AVERAGE}} \quad (10)$$

The output of the spatial filter is added by adder 265 to the original luminance signal input signal 210 to create an enhanced luminance output signal 270.

The invention can also be applied to high definition (HD) and standard definition (SD) sequences such as would be present in a video storage application having high definition (HD) capabilities and allowing long play (LP) mode. The majority of such video sequences are transcoded to a lower storage bitrate from broadcast MPEG-2 bitstreams. For the long play (LP) mode of this application, format change can also take place during transcoding. Standard definition (SD) or high definition (HD) video sequences are encoded, decoded, and then processed with the sharpness enhancement algorithm, according to the present invention, provide superior video quality for a priori encoded or transcoded video sequences as compared to algorithms that do not use coding information.

Figure 5:
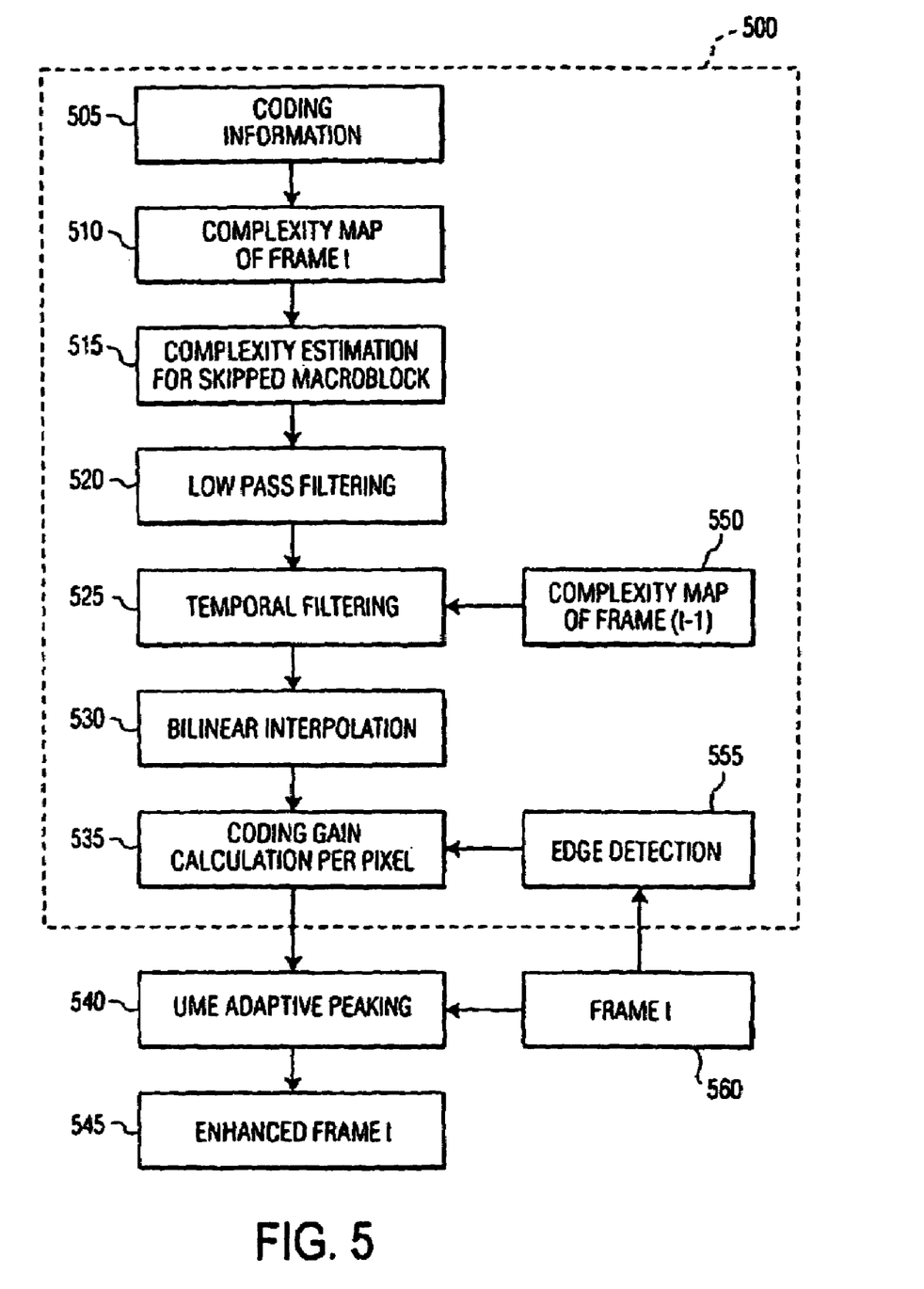
FIG. 5 is a flow diagram illustrating an advantageous embodiment of a method of operation of the present invention.

FIG. 5 is a flow diagram illustrating an advantageous embodiment of the method of the present invention. The method for calculating the coding gain for processing one frame (frame "t") is generally indicated by the number 500. First the coding information is obtained (step 505). Then the complexity map of frame "t" is obtained (step 510). Next the complexity estimation for a skipped or non-coded macroblock (MB) (if any) is determined (step 515).

Step 520 is the step of filtering the complexity map with a low pass filter using the filter kernel of Equation (4). Step 525 is the step of temporally filtering the complexity map using Equation (9), Equation (10), and the complexity map of the previous frame (frame "t−1"). Step 550 is the step of obtaining the complexity map of the previous frame (frame "t−1"). The complexity map information for frame "t−1" is used by step 525. Step 530 is the step of performing bilinear interpolation on the signal after the temporal filtering of step 525. The coding gain per pixel is then calculated (step 535).

Information from frame "t" is obtained (step 560) and is used to detect edges in the picture within frame "t" (step 555). The result of the edge detection process of step 555 is provided to the calculation of the coding gain per pixel in step 535.

After the coding gain per pixel has been calculated in step 535, the usefulness metric (UME) is then used in the adaptive peaking process (step 540). The UME adaptive peaking process of step 540 also uses information obtained from frame "t" in step 560.

The result of the UME adaptive peaking process of step 540 is displayed as an enhanced frame "t" (step 545).

The above described method may be summarized as follows. The method assumes that the macroblock (MB) or block level complexity map is available for time "t". An estimation of the complexity of skipped or non-coded macroblocks (MB) or blocks is then carried out. In order to reduce the blocking structure of the complexity map, a low pass filtering using the filter kernel of Equation (4) is applied. Then follows the temporal filtering of the complexity map using Equation (9), Equation (10), and the complexity map of the previous frame. The complexity value of each pixel is estimated by bilinear interpolation from the macroblock (MB) or block complexity map. Using the complexity value for each pixel and the result of the edge detection process, a coding gain is calculated for each pixel. The adaptive peaking using UME is applied to each pixel of a frame to create the enhanced frame "t".

If the algorithm is to be applied to interlaced video sequences, some of the calculations may be adapted to the characteristics of interlaced video. The complexity calculation will be changed due to the fact that for interlaced video sequences the MPEG stream can have either field or frame structured pictures. In field structured pictures the blocks can contain data only from one field and each block is field DCT coded. Therefore, the complexity calculation for progressive video can be applied as it is for field structured pictures.

However, in frame structured pictures the blocks can be frame-or field-DCT coded. In the frame-DCT case, a block consists of data from both fields. Therefore, a "field-complexity" for an eight by eight (8×8) block can be only estimated. It is possible to use two (2) blocks from one macroblock (MB) to calculate the "field-complexity" of a block. It may be seen from these considerations that in interlaced video the complexity calculation for blocks if more straightforward than for macroblocks (MB).

Although the present invention has been described in detail with respect to certain embodiments thereof including the illustrative example of a digital television set, the invention is not limited to the described embodiments and modifications thereto. It is understood that those skilled in the art can make various changes, substitutions, modifications, alterations, and adaptations in the present invention without departing from the concept and scope of the invention in its broadest form.

What is claimed is:

1. An apparatus for enhancing image quality of a previously coded digital video signal in a digital video system, said apparatus comprising:
a usefulness metric generator configured for generating a usefulness metric using coding information and scene content related information, the usefulness metric being utilized to determine an amount of video enhancement that can be applied to said previously coded digital video signal without enhancing coding artifacts.

2. The apparatus as claimed in claim 1, further comprising:
at least one sharpness enhancement unit that is configured for applying a sharpness enhancement algorithm to said previously coded digital video signal, and
a coding gain control block configured for using said usefulness metric to determine an allowable amount of sharpness enhancement applied to said previously coded digital video signal by said at least one sharpness enhancement unit.

3. An apparatus for enhancing image quality of a previously coded digital video signal, the apparatus comprising:
a usefulness metric generator configured for generating a usefulness metric utilized to determine an amount of video enhancement that can be applied to the previously coded digital video signal without enhancing coding artifacts, said usefulness metric generator calculating, on a pixel by pixel basis, how much a pixel can be enhanced without increasing the coding artifacts.

4. The apparatus as claimed in claim 3, wherein a pixel coding gain is determined by the equation:

$$g_{coding}(i,j) = UME(i,j) + g_{edge}(i,j)$$

and wherein i and j are pixel coordinates, $g_{coding}$ is the pixel coding gain, UME is a usefulness metric, and $g_{edge}$ is based upon edge related information derived from an image.

5. The apparatus as claimed in claim 4 wherein a value for $g_{edge}(i,j)$ is calculated by setting the value of $g_{edge}(i,j)$ equal to (1) an experimentally determined value c for an edge pixel p (1,j) at a spatial location (i,j), and to (2) a value of one half of c for a pixel p(i−1, j) at a spatial location (i−1,j) and for a pixel p(i+1,j) at a spatial location (i+1,j), and to (3) a value of one fourth of c for a pixel p(i−2,j) at a spatial location (i−2,j) and for a pixel p(i+2,j) at a spatial location (i+2,j), and to (4) a value of zero for all other pixels.

6. The apparatus as claimed in claim 3, wherein said usefulness metric generator utilizes coding information to generate said usefulness metric.

7. A digital video system comprising an apparatus for enhancing image quality of a previously coded digital video signal in said digital video system, said apparatus comprising:
a usefulness metric generator configured for generating a usefulness metric using coding information and scene content related information, the usefulness metric being utilized to determine an amount of video image enhancement that can be applied to said previously coded digital video signal without enhancing coding artifacts.

8. The digital video system as claimed in claim 7, further comprising:
at least one sharpness enhancement unit that is configured for applying a sharpness enhancement algorithm to said previously coded digital video signal, and
a coding gain control block configured for using said usefulness metric to determine an allowable amount of sharpness enhancement applied to said previously coded digital video signal by said at least one sharpness enhancement unit.

9. A digital video system, comprising:
at least one sharpness enhancement unit configured for applying a sharpness enhancement algorithm to a previously coded digital video signal; and
an apparatus for enhancing image quality of the previously coded digital video signal in the digital video system, the apparatus including a usefulness metric generator configured for generating a usefulness metric utilized to determine an amount of video image enhancement that can be applied to the previously coded digital video signal without enhancing coding artifacts, said usefulness metric generator calculating, on a pixel by pixel basis, how much a pixel an be enhanced without increasing the coding artifacts.

10. The digital video system as claimed in claim 9, it wherein a pixel coding gain is determined by the equation:

$$g_{coding}(i,j)=UME(i,j)+g_{edge}(i,j)$$

and wherein i and j are pixel coordinates, $g_{coding}$ is the pixel coding gain, UME is a usefulness metric, and $g_{edge}$ is based upon edge related information derived from an image.

11. The digital video system as claimed in claim 10 wherein a value for $g_{edge}$ (i,j) is calculated by setting the value of $g_{edge}$ (i,j) equal to (1) an experimentally determined value c for an edgepixel p (i,j) at a spatial location (i,j), and to (2) a value of one half of c for a pixel p(i−1,j) at a spatial location (i−1,j) and for a pixel p (i+1,j) at a spatial location (i+1,j), and to (3) a value of one fourth of c for a pixel p(i−2, j) at a spatial location (i−2, j) and for a pixel p (i+2, j) at a spatial location (i+2,j), and to (4) a value of zero for all other pixels.

12. The digital video system as claimed in claim 9, wherein said usefulness metric generator utilizes coding information to generate said usefulness metric.

13. A method for enhancing image quality of a previously coded digital video signal in a digital video system, said method comprising:

generating a use flilness metric in said digital video system using coding information and scene content related information; and utilizing said use fulness metric to determine an amount of video image enhancement that can be applied to said previously coded digital video signal without enhancing artifacts.

14. The method as claimed in claim 13, wherein said digital video system comprises:

at least one sharpness enhancement unit configured for applying a sharpness enhancement algorithm to said previously coded digital video signal, and a coding gain control block configured for using the usefulness metric to determine an allowable amount of sharpness enhancement applied to said previously coded digital video signal by said at least one sharpness enhancement unit.

15. The method of claim 13, wherein the coding information comprises at least one of: a quantization step size, a macroblock type, and a forward motion vector.

16. A method for enhancing image quality of a previously coded digital video signal in a digital video system, the method comprising:

generating a usefulness metric;

utilizing the use filness metric to determine an amount of video image enhancement that can be applied to the previously coded digital video signal without enhancing coding artifacts; and calculating, on a pixel by pixel basis, how much a pixel can be enhanced without increasing the coding artifacts.

17. The method as claimed in claim 16, wherein a pixel coding gain is determined by the equation:

$$g_{coding}(i,j)=UME(i,j)+g_{edge}(i,j)$$

and wherein i and j are pixel coordinates, $g_{coding}$ is the pixel coding gain, UME is a usefulness metric, and $g_{edge}$ is based upon edge related information derived from an image.

18. The method as claimed in claim 17 wherein a value for $g_{coding}$ (i,j) is calculated by setting the value of $g_{edge}$ (i,j) equal to (1) an experimentally determined value c for an edge pixel p (i,j) at a spatial location (i,j), and to (2) a value of one half of c for a pixel p(i−1,j) at a spatial location (i−1,j) and for a pixel p(i+1,j) at a spatial location (i+1,j), and to (3) a value of one fourth of c for a pixel p(i−2,j) at a spatial location (i−2,j) and for a pixel p(i+2,j) at a spatial location (i+2,j), and to (4) a value of zero for all other pixels.

19. The method as claimed in claim 16, further comprising utilizing coding information to generate said usefulness metric.

* * * * *